United States Patent [19]

Hillenburg

[11] Patent Number: 4,946,176
[45] Date of Patent: Aug. 7, 1990

[54] CHUCK WITH MOVABLE JAW HALVES

[76] Inventor: Mark W. Hillenburg, 3902 Wagner Lee, Corpus Christi, Tex. 78418

[21] Appl. No.: 257,542

[22] Filed: Oct. 14, 1988

[51] Int. Cl.⁵ ............................................. B23B 31/16
[52] U.S. Cl. ................................................... 279/111
[58] Field of Search ............... 279/117, 111, 112, 113, 279/116, 123, 121, 119, 120, 118, 110, 153, 114; 269/156, 207, 110

[56] References Cited

U.S. PATENT DOCUMENTS

| | | | |
|---|---|---|---|
| 209,897 | 11/1878 | King | 279/112 X |
| 295,230 | 3/1884 | Colton | 279/113 |
| 609,019 | 8/1898 | Fitz et al. | 279/111 |
| 1,007,132 | 10/1911 | Miller . | |
| 1,130,768 | 3/1915 | Schultz | 279/119 |
| 1,188,807 | 6/1916 | Miller | 279/119 |
| 1,452,753 | 4/1923 | Otto et al. | 269/207 |
| 1,520,969 | 12/1924 | Smart . | |
| 1,628,476 | 5/1927 | Sloan | 279/123 |
| 1,631,499 | 6/1927 | Morgal . | |
| 1,635,481 | 7/1927 | Jorner | 279/113 |
| 1,790,744 | 2/1931 | Church | 279/119 |
| 1,794,511 | 3/1931 | Bush | 279/116 X |
| 2,045,487 | 6/1936 | Oslind | 279/123 |
| 2,151,455 | 3/1939 | Whiton . | |
| 2,920,896 | 1/1960 | Buck | 279/123 |
| 3,089,708 | 5/1963 | Long . | |
| 3,096,098 | 7/1963 | Buck | 279/123 |
| 3,366,393 | 1/1968 | Bullard, III . | |
| 4,718,682 | 1/1988 | Zilic et al. . | |

FOREIGN PATENT DOCUMENTS 503531  12/1954  Italy ....................................  279/111

Primary Examiner—Z. R. Bilinsky
Assistant Examiner—Robert Schultz
Attorney, Agent, or Firm—G. Turner Moller

[57] ABSTRACT

A chuck comprises a scroll to simultaneously move a plurality of chuck jaw assemblies radially toward and away from a work piece. The chuck jaw assemblies include an inner chuck jaw part in engagement with the scroll and an outer chuck jaw part movable relative to the inner chuck jaw part radially toward and away from the axis. A ball detent mechanism returns to return the outer chuck jaw part to a predetermined or centered location after one work piece has been machined in preparation for work on the next work piece.

17 Claims, 4 Drawing Sheets

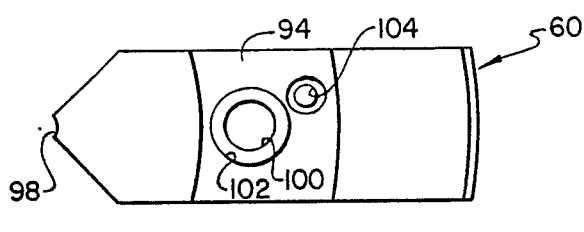
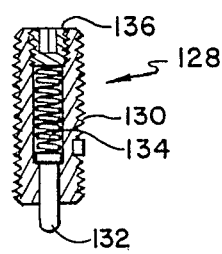
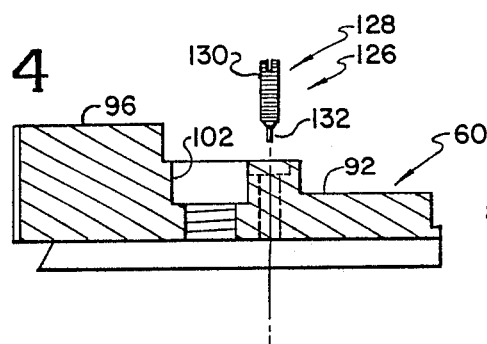
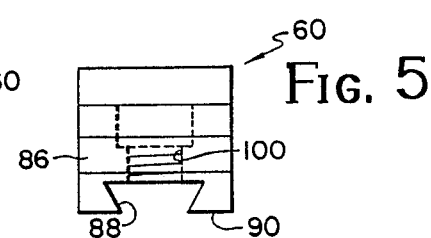
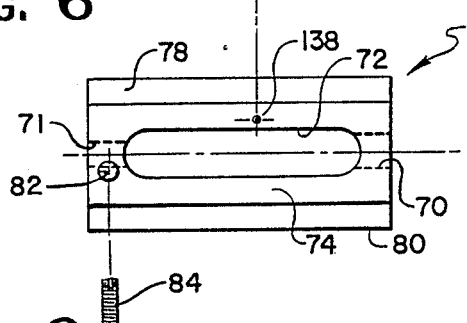
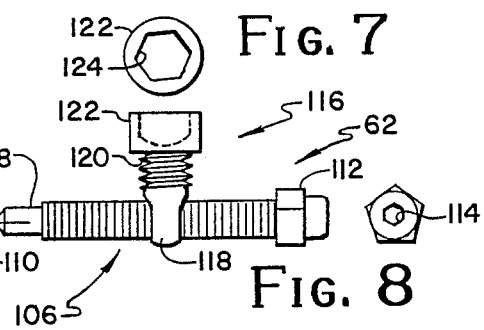
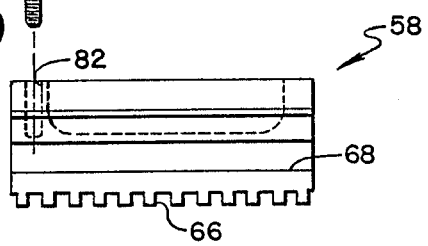
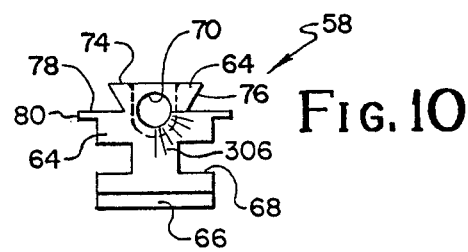
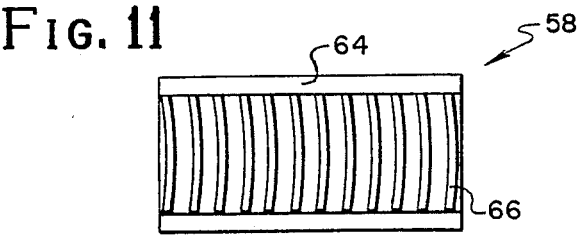

FIG. 17
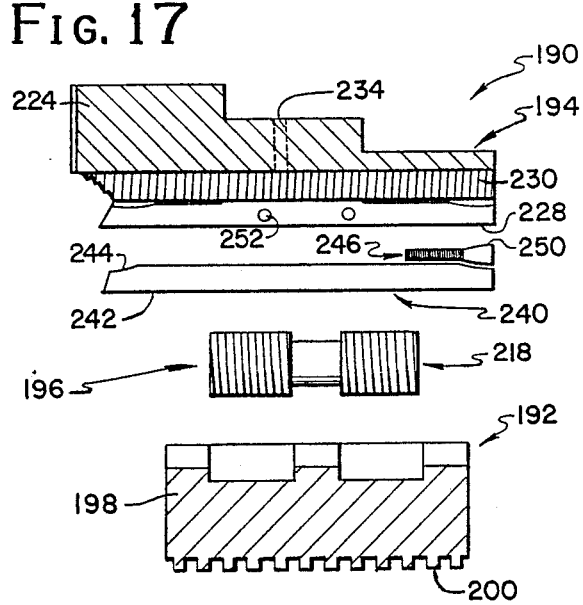
FIG. 18
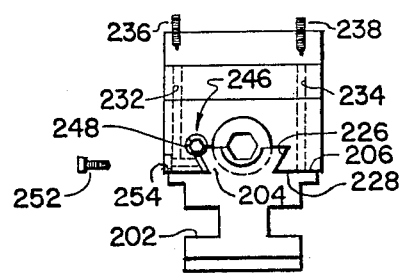
FIG. 23
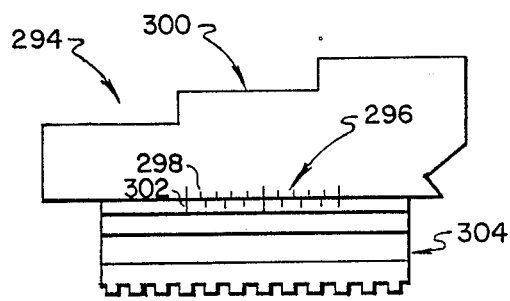
FIG. 19
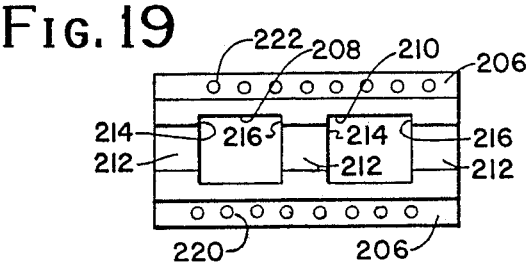
FIG. 20
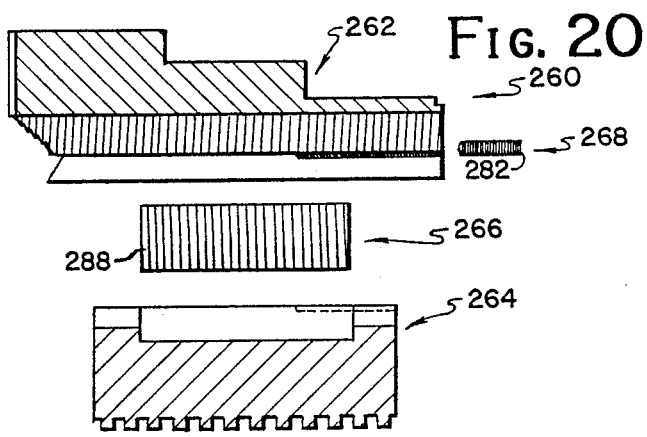
FIG. 22
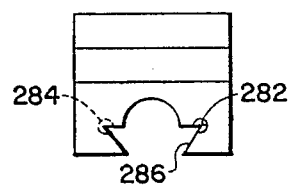
FIG. 21
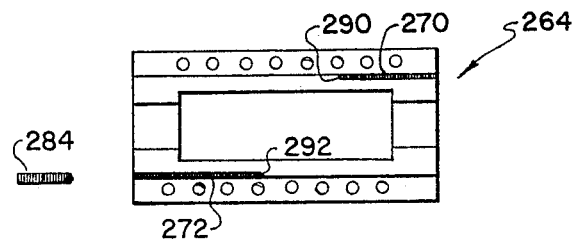
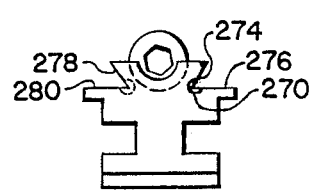

CHUCK WITH MOVABLE JAW HALVES

This invention relates to a chuck for a machine tool having jaws which are radially adjustable to accommodate work of different size.

Chucks have long been provided to hold a metal work piece so the piece can be machined, as in a lathe, milling machine or the like. Typically, the chuck jaws can be radially advanced and retracted to accommodate symmetrical work of different size. One well developed technique for advancing and retracting the chuck jaws relative to the chuck axis is a scroll or spirally threaded member threadably engaging the chuck jaws. Typical disclosures of such chucks are found in U.S. Pat. No. 1,520,969 and 1,631,499.

In chucks which advance the chuck jaws simultaneously, it is desirable to make chuck jaws in separate adjustable parts to allow non-symmetrical work pieces, e.g. rectangular, to be grasped by the chuck. It is accordingly well known to provide a inner chuck part for radial adjustment by the scroll and an outer chuck part radially adjustable relative to the inner chuck part. Typical discloses of this type are in U.S. Pat. No. 1,007,132; 2,151,455; and 4,718,682.

Where the inner and outer chuck jaw parts are relatively adjustable, it is quite desirable to provide means defining a fixed or known position for the outer chuck jaw so the chuck jaw can be returned to its original position after adjustment, as is necessary when beginning to machine a new work piece of different shape. Typical disclosures providing solutions to this problem are shown in U.S. Pat. Nos. 1,628,476; 3,089,708 and 3,366,393. It is this type device to which this invention most nearly relates.

Some of these prior art devices, i.e. those shown in U.S. Pat. No. 1,628,476 and 3,089,708, incorporate an adjustment screw which moves the upper chuck jaw relative to the lower chuck jaw. A spring biased detent arrangement is carried by the upper chuck jaw and a recess is provided by the screw so the detent enters the recess when the screw moves the upper chuck jaw to its calibrated position relative to the lower chuck jaw. When the detent enters the recess in the adjustment screw, the machinist can hear or feel the detent reacting and can detect that the adjustment screw is more difficult to turn than previously.

One substantial problem with this arrangement is that the lead screw threads, the mating threads, the system retaining the lead screw and the area which the retaining system contacts on the upper and lower chuck jaws are, over the years, subject to wear. Because the calibrated position depends on the position of the lead screw, these arrangements inherently get out of calibration as the equipment wears.

The chuck of this invention comprises a chuck body having an axis, chuck jaws movable radially in the body including a first jaw part, a second jaw part mounted on the first jaw part for movement toward and away from the axis independent of the first jaw part for engaging a work piece, and a threaded member interconnecting the first and second jaw parts for moving the second jaw part independently of the first jaw part, means carried by the body and engaging the first jaw part for simultaneously moving the first and second jaw parts toward and away from the axis, and means carried by the jaw parts to determine when the jaws are concentric with the axis, including a spring biased detent carried by one of the jaw parts, the other jaw part providing a recess receiving the detent.

It is an object of this invention to provide a chuck having adjustable chuck jaw parts and means for easily returning the chuck jaw parts to a calibrated position after adjustment.

Another object of this invention is to provide a chuck having adjustable chuck jaw parts and means for determining when the chuck jaw parts have been returned to a calibrated position after adjustment.

These and other objects of this invention will become more fully apparent as this description proceeds, reference being made to the accompanying drawings and appended claims.

IN THE DRAWINGS

FIG. 3 is a top plan view of an outer chuck jaw of this invention;

FIG. 4 is a longitudinal cross-sectional view of the chuck jaw of FIG. 3, taken substantially along line 4—4 thereof as viewed in the direction indicated by the arrows;

FIG. 5 is an end view of the outer chuck jaw of FIGS. 3 and 4;

FIG. 6 is an exploded view of an inner chuck jaw shown in top plan and an adjustment screw in side elevation;

FIG. 7 is a top plan view of part of the adjustment screw of FIG. 6;

FIG. 8 is an end view of part of the adjustment screw of FIG. 6;

FIG. 9 is a side elevational view of the inner chuck part of FIG. 6;

FIG. 10 is an end view of the inner chuck part of FIGS. 6 and 9;

FIG. 11 is a bottom plan view of the inner chuck part of FIGS. 6, 9 and 10;

FIG. 12 is a longitudinal cross-sectional view of a spring biased detent used in this invention;

FIG. 17 is an exploded cross-sectional view of another chuck jaw assembly of this invention;

FIG. 18 is an exploded end view of the embodiment of FIG. 17;

FIG. 19 is a top view of the inner jaw part of FIGS. 17 and 18;

FIG. 20 is an exploded cross-sectional view of another chuck jaw assembly of this invention;

FIG. 21 is a top view of the inner jaw part of FIG. 20;

FIG. 22 is an exploded end view of the embodiment of FIGS. 20-21; and

FIG. 23 is a side view of the inner jaw part of FIGS. 20-22.

Figure 1:
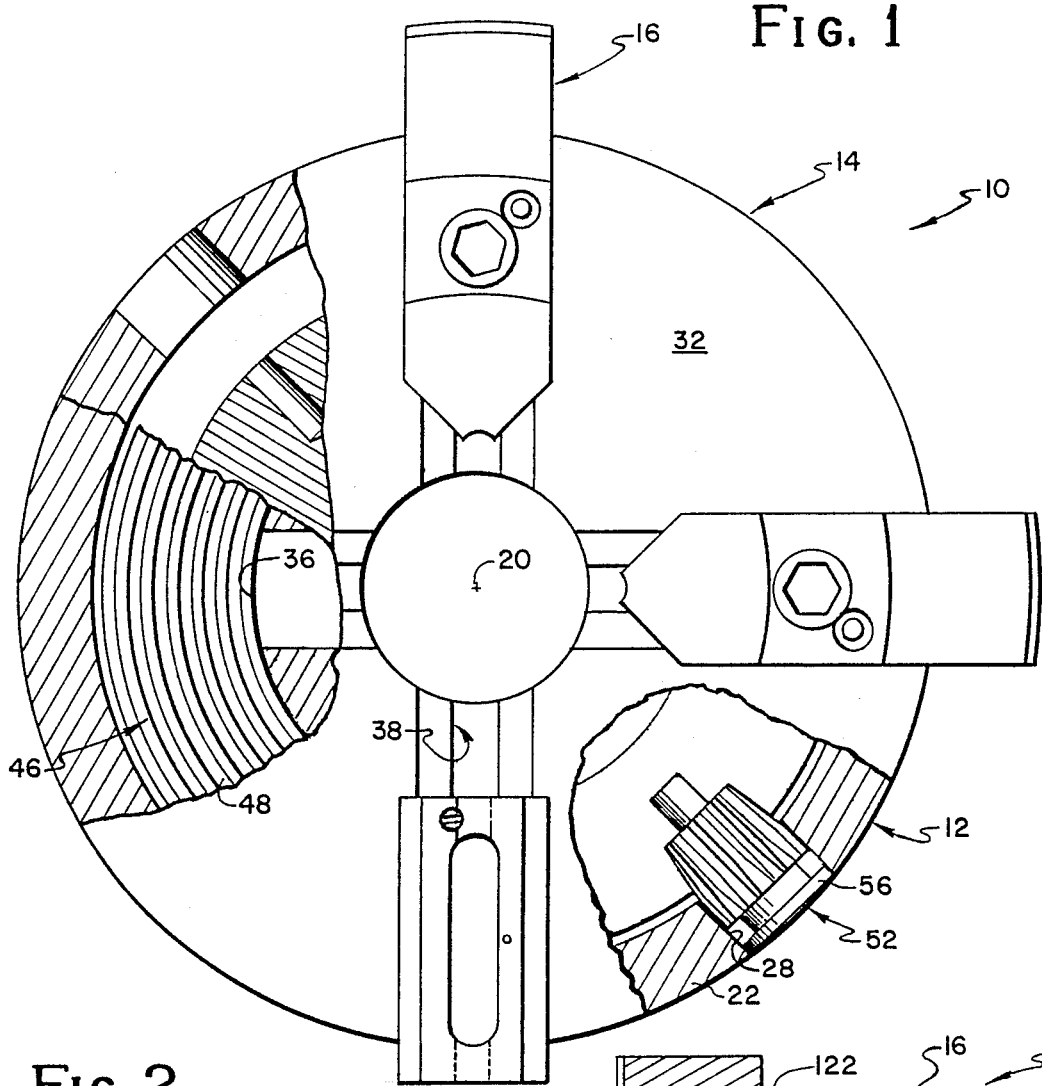
FIG. 1 is a top plan view of a chuck of this invention, certain parts being broken away for clarity of illustration.
Figure 2:
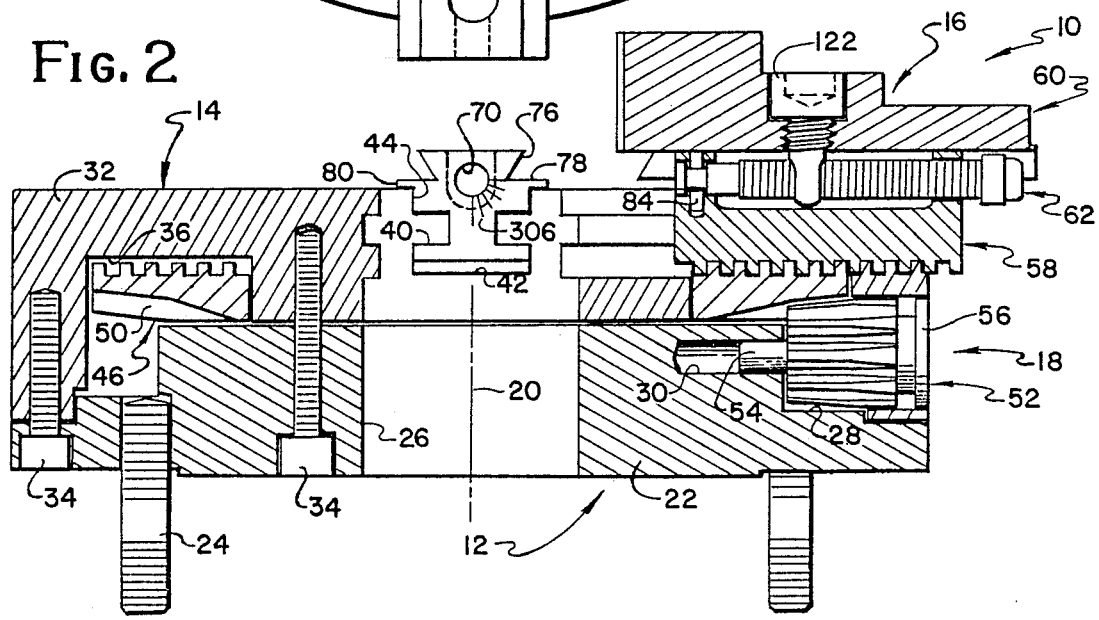
FIG. 2 is a cross-sectional view of the chuck of FIG. 1, taken substantially along line 2—2 thereof as viewed in the direction indicated by the arrows.
Figure 13:
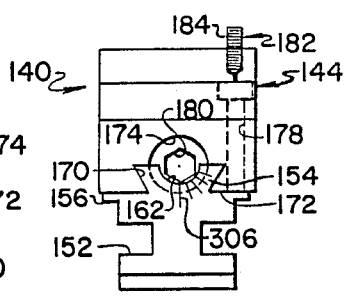
FIG. 13 is an exploded cross-sectional view of another chuck jaw assembly of this invention.

Referring to FIGS. 1 and 2, a chuck 10 of this invention comprises, as major components, an axially inner or back plate 12 for attachment to a machine tool, an axially outer or front plate 14, a plurality of chuck jaw assemblies 16 mounted for radial movement on the front plate 14 and an adjustment mechanism 18 for moving the assemblies 16 toward and away from the chuck axis 20.

The back plate 12 includes a massive metallic member 22 providing threaded fasteners 24 for connection to the machine tool with which the chuck 10 is used. The member 22 provides a central opening 26. A series of recesses 28, 30 are provided to receive part of the adjustment mechanism 18 as will be more fully apparent hereinafter.

The front plate 14 includes a massive metallic member 32 providing a plurality of tapped blind passages receiving a plurality of threaded fasteners 34 connecting the back and front plates 12, 14 together. The member 32 provides an annular recess 36 for receiving part of the adjustment mechanism 18. In addition, two or more slots 38, equally or unequally spaced, extend from the outer edge of the chuck 10 into the opening 26 in a radial direction relative to the axis 20. As shown best in FIG. 2, the slots 38 include a pair of facing ribs 40 providing parallel inner and outer horizontal slot sections 42, 44. The outer horizontal slot section 44 opens through the face of the member 32. The slots 38 accordingly receive the jaw assemblies 16 and allow movement thereof in a radial direction toward and away from the axis 20.

The adjustment mechanism 18 comprises an annular scroll ring 46 positioned in the recess 36 having a spiral or scroll thread 48 on the axial outer surface thereof and a multiplicity of gear teeth 50 on the axial inner surface thereof. The scroll thread 48 is in meshing engagement with the jaw assemblies 16. A pinion 52 allows for rotary adjustment of the scroll ring 46, fits in the recess 28 and provides a stub shaft 54 rotatably received in the pilot recess 30. The pinion 52 meshes with the gear teeth 50 so rotation of the pinion 52 causes the scroll ring 46 to rotate about the axis 20 thereby advancing or retracting the jaw assemblies 16 relative to the axis 20. The pinion 52 accordingly provides an end 56 for receiving an Allen wrench or the like. Those skilled in the art will recognize the chuck 10, as heretofore described, as representative of prior art scroll chucks.

The jaw assemblies 16 comprise an axially inner jaw part 58 received in the slot 38 and engaged with the scroll ring 46, an axially outer jaw part 60 and an adjustment mechanism 62 for moving the outer jaw part 60 relative to the inner jaw part 58.

As shown best in FIGS. 2-11, the inner jaw part 58 includes a more-or-less rectangular body 64 having a multiplicity of parallel arcuate thread segments 66 on the bottom thereof meshing with the scroll thread 48. The sides of the body 64 provide radial grooves 68 receiving and being guided by the ribs 40 as shown best in FIG. 2. The inner jaw parts 58 of the jaw assemblies 16 are accordingly mounted on the upper plate 14 for simultaneous radial movement toward and away from the axis 20 in response to rotation of the pinion 52 and the scroll 46.

The inner jaw part 58 also includes a pair of outwardly directed faces 78 having wings 80 to abut the outer face of the plate 14 as shown in FIG. 2. An upwardly facing tapped hole 82 is provided in the dove tail section 76 to receive a set screw 84 for purposes more fully pointed out hereinafter.

The outer jaw part 60 is mounted on the dove tail section 76 for radial adjustment relative to the inner jaw part 58. To this end, the outer jaw part 60 includes a body 86 having a more-or-less conventional female dove tail section or slot 88 opening through an inner face 90 abutting and sliding on the faces 78 of the inner jaw part 58. The outer surface of the chuck part 60 includes a series of stepped radially spaced shoulders 92, 94, 96 in which the shoulder 96 provides a conventional work engaging end 98. A threaded opening 100 opens, at the inner end thereof, into the dove tail slot 88 and opens, at the outer end thereof, into an unthreaded recess 102 opening through the shoulder 94. An offset threaded opening 104 extends through the shoulder 94 for purposes more fully apparent hereinafter.

The adjusting means 62 includes a lead screw 106 having an unthreaded radially inner end 108 providing a groove 110 spaced from the end thereof and a radially outer end 112 providing a blind opening 114 of regular polygonal shape for receiving a suitable force applier, such as an Allen wrench. Threadably received on the lead screw 106 is a force transmitting connection 116 including an internally threaded section 118 receiving the lead screw 106, an externally threaded section 120 received in the threaded opening 100 and an outer end 122 providing a blind opening 124 of regular polygonal shape for receiving an Allen wrench or other force applier.

To connect the jaw parts 58, 60, the dove tail 76 of the inner jaw 58 slides through the dove tail slot 88 of the outer jaw 60. The connection 116 is threaded through the opening 100 until the internally threaded section 118 extends through the dove tail slot 88 into the elongate slot 72 of the inner jaw part 58. The lead screw 106 is inserted into the unthreaded passage section 71 and then into the threaded section 118 of the connection 116. The lead screw 106 is turned to position the connection 116 intermediate the ends of the lead screw 106. The unthreaded end 108 of the lead screw 106 is then inserted into the unthreaded passage section 71 and the lead screw 106 turned to expose the tapped hole 82. The set screw 84 is then inserted into the tapped hole 82 and groove 110 to captivate the lead screw 106 to the inner jaw part 58.

An important feature of this invention is means 126 for resetting the outer jaw 60 relative to the lower jaw 58 at a predetermined or zeroed location relative to the axis 20. The means 126 comprises a spring biased detent assembly 128 threaded into the opening 104. As shown best in FIG. 12, the assembly 128 includes a threaded shank 130, a detent 132, a spring 134 biasing the detent 132 away from the shank 130 and a threaded keeper 136 holding the spring 134 inside the shank 130. At the predetermined or zeroed location, the detent 132 engages and drops into a recess 138 on the outer face 74 of the lower jaw part 58. Because the detent 132 is directly carried by the outer jaw part 60 and the recess 138 is in the inner jaw part 58, any wear that occurs in the adjustment mechanism 62 is irrelevant. The assembly 128 is selected so that the detent 132 is considerably softer than the material of the lower jaw part 58. Accordingly, any wear that may occur on the centering means 126 occurs on the assembly 128 which may be replaced on a regular or periodic basis.

In use, the pinion 52 is rotated to turn the scroll 46 to advance the chuck jaw assemblies 16 toward the work. If the work is square, no adjustment of the outer jaw part 60 is needed. If the work is asymmetrical, the outer jaw parts 60 of the assemblies 16 that do not engage the work are radially advanced toward the work by rotation of the adjusting means 62 which causes the detent 132 to move out of the recess 138. When machining on the asymmetric work is complete and the operator is ready to start on the next work piece, the lead screw 106 is rotated to retract the outer jaw part 60 relative to the inner jaw part 58. As the detent 132 moves into engagement with the recess 138, the machinist will recognize that the outer jaw part 60 is at the predetermined or zeroed location because the detent 132 snaps into the recess 138 and can be heard and felt. In addition, continued rotation of the lead screw 106 will momentarily be more difficult because the detent 132 has to be cammed out of the recess 138.

Referring to FIGS. 13–16, there is illustrated another chuck jaw assembly 140 of this invention comprising an axially inner jaw part 142 for receipt in the slot 38 for engagement with the scroll ring 46, an axially outer jaw part 144 and an adjustment mechanism 146 for moving the outer jaw part 144 relative to the inner jaw part 142.

The inner jaw part 142 includes a more-or-less rectangular body 148 having a multiplicity of parallel arcuate thread segments 150 on the bottom thereof for meshing with the scroll thread 48. The sides of the body 148 provide radial grooves 152 for receiving and being guided by the ribs 40. The inner jaw part 142 may accordingly be mounted on the upper plate 14 for simultaneous radial movement toward and away from the axis 20 in response to rotation of the pinion 52 and the scroll 46.

The inner jaw part 142 also includes a male dove tail section 154 similar to the dove tail section 76 and a pair of wings 156 comparable to the wings 80. The inner jaw part 142 includes a smooth semi-cylindrical recess 158 opening through the outer surface 159 of the body 148 for receiving a threaded member 160 of the adjustment mechanism 146 as will be more fully apparent hereinafter. The recess 158 is somewhat larger than a pair of aligned semicylindrical passages 162 opening radially through the dove tail section 154 providing a pair of shoulders 164. A plurality of dimples or recesses 166 on one of the wings 156 act similarly to the recess 138 as will be evident hereinafter.

The outer jaw part 144 is mounted on the dove tail section 154 for radial adjustment relative to the inner jaw part 142. To this end, the outer jaw part 144 includes a body 168 having a more-or-less conventional female dove tail section or slot 170 opening through an inner face 172 abutting and sliding on the inner jaw part 142. The outer surface of the chuck part 144 includes a series of conventional stepped radially spaced shoulders. A semicylindrical passage 174 extends radially through the body 168. The passage 174 is threaded with a interrupted helical thread of any suitable shape. A threaded opening 176 opens, at the inner end thereof, into the passage 174 to receive a set screw to fix the adjusting screw 160 in a locked position. An offset threaded opening 178 extends through the body 168 for purposes more fully apparent hereinafter.

The adjusting means 146 includes the lead screw 160 which is a simple all thread member received and captivated in the recess 158. The end of the screw 160 has a wrench socket 180 so the screw 160 can be turned. In the assembled position, the threads of the screw 160 mesh with the interrupted threads of the passage 174 so that rotation of the screw 160 causes the screw 160 to react against the shoulders 164 and move the outer chuck part 144 radially relative to the inner chuck part 142. It is evident that the outer chuck part 144 may be provided with the smooth recess 158 and the inner chuck part 142 may be provided with the threaded passage 174.

An important feature of this invention is means 182 for resetting the outer jaw 144 relative to the inner jaw 142 at a predetermined or zeroed location relative to the chuck axis 20. The means 182 comprises a spring biased detent assembly 184, identical to the assembly 128, threaded into the opening 178. At the predetermined or zeroed location, a detent engages and drops into a central one of the recesses 166 on the wing 156 of the lower jaw part 142. Because the detent is directly carried by the outer jaw part 144 and the recess 166 is in the inner jaw part 142, any wear that occurs in the adjustment mechanism 146 is irrelevant.

Figure 15:
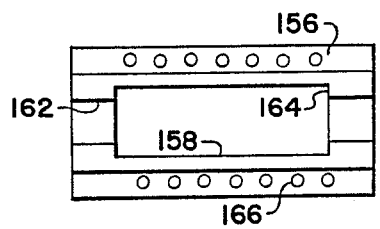
FIG. 15 is a top view of the inner jaw part of FIGS. 13 and 14.

As seen best in FIG. 15, a plurality of recesses 166 are provided. The recesses 166 are regularly spaced at a predetermined common distance, such as 100/1000", ⅛" or ¼", depending on the size of the chuck. The machinist can readily tell when the outer chuck jaw 144 is at the centered or zeroed location and also has a guide to help him position the outer jaw part 144 at a predetermined fixed distance from the zeroed position.

Figure 16:
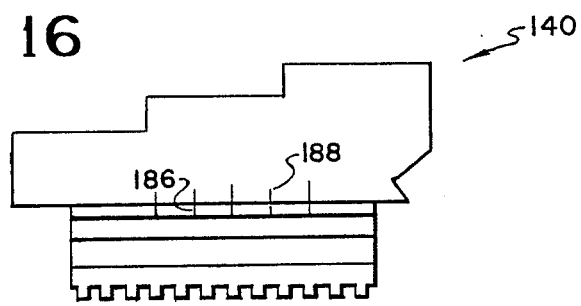
FIG. 16 is a side view of the embodiment of FIG. 13.

As shown best in FIG. 16, the inner and outer jaw parts 142, 144 are also provided with indicia or scratches 186, 188 on the sides thereof to allow the machinist to visually determine when the inner and outer jaw parts 142, 144 are at their centered location, or at one of the offset locations corresponding to the locations of the recesses 166.

Referring to FIGS. 17–19, there is illustrated another chuck jaw assembly 190 of this invention comprising an axially inner jaw part 192 for receipt in the slot 38 for engagement with the scroll ring 46, an axially outer jaw part 194 and an adjustment mechanism 196 for moving the outer jaw part 194 relative to the inner jaw part 192.

The inner jaw part 192 includes a more-or-less rectangular body 198 having a multiplicity of parallel arcuate thread segments 200 on the bottom thereof for meshing with the scroll thread 48. The sides of the body 198 provide radial grooves 202 for receiving and being guided by the ribs 40. The inner jaw part 192 may accordingly be mounted on the upper plate 14 for simultaneous radial movement toward and away from the axis 20 in response to rotation of the pinion 52 and the scroll 46.

The inner jaw part 192 also includes a male dove tail section 204 similar to the dove tail sections 76, 154 and a pair of wings 206 comparable to the wings 80, 156. The inner jaw part 192 differs from the inner jaw part 142 in only one respect. Instead of having a simple, smooth semicylindrical recess for receiving the lead screw, a pair of smooth semicylindrical recesses 208, 210 are provided. Three unthreaded aligned semicylindrical passages 212 connect the recesses 208, 210 and open radially through the dove tail section 204 providing two sets of shoulders 214, 216. As will be more fully apparent hereinafter, a lead screw 218 can react against one of the shoulder sets 214 when pushing the outer chuck jaw 194 in one direction and can react against the other shoulder set 216 when pushing the chuck jaw 194 in the other direction. A first set of dimples or recesses 220 on one of the wings 206 act similarly to the recesses 166 while a second set of recesses 222 on the other wing 206 are offset as will be evident hereinafter.

The outer jaw part 194 is mounted on the dove tail section 204 for radial adjustment relative to the inner jaw part 192. To this end, the outer jaw part 194 includes a body 224 having a more-or-less conventional female dove tail section or slot 226 opening through an inner face 228 abutting and sliding on the inner jaw part 192. The outer surface of the chuck part 194 includes a series of conventional stepped radially spaced shoulders. A semicylindrical passage 230 extends radially through the body 224. The passage 230 is threaded with a conventional interrupted helical thread. A pair offset threaded openings 232, 234 extend through the body 224 for purposes more fully apparent hereinafter.

An important feature of this invention is means 236 for resetting the outer jaw 194 relative to the inner jaw 192 at a predetermined or zeroed location relative to the chuck axis 20. The means 236 comprises a pair of spring biased detent assemblies 238, identical to the assemblies 128, 184, threaded into the openings 232. 234. At the predetermined or zeroed location, a detent engages and drops into a central one of the recesses 222 on the wing 206 of the lower jaw part 192. Because the detent is directly carried by the outer jaw part 194 and the recess 222 is in the inner jaw part 192, any wear that occurs in the adjustment mechanism 196 is irrelevant.

As seen best in FIG. 19, the inner jaw part 192 provides a plurality of recesses 220, 222 on each side. The recesses 222 are regularly spaced at a predetermined common distance such as 100/1000", ⅛" or ¼", depending on the size of the chuck with the center recess corresponding to the centered position of the outer jaw part 194 relative to the axis. The machinist can readily tell when the outer chuck jaw 194 is at the centered or zeroed location and also has a guide to help him position the outer jaw part 194 at a predetermined fixed distance from the zeroed position. The recesses 220 on the opposite side of the jaw part 192 are spaced apart the same distance as the recesses 222 and are positioned at a point exactly midway between the recesses 222. Thus, the centering means 236, 238 are capable of twice the resolution, when compared to the centering means 182, when assisting the machinist in setting the outer jaw part 194.

A concern with relatively movable chuck jaws is that wear may occur in the adjustment mechanisms. To localize and overcome such wear, an adjustable shim mechanism 240 is provided. The shim mechanism 240 includes a thin elongate member 242 beveled on the long edges thereof to fit in the dove tail slot 226 at an angle complementary to the other inclined face of the slot. The member 242 is substantially the length of the slot 226 and includes slightly bevelled end edges 244. A screw 246 is received in a threaded passage 248 which exposes a bevelled end 250 of the screw 246. Thus, threaded advancement of the screw 246 into the passage 248 ultimately causes the bevelled screw end 250 to engage the bevelled edge 244 thereby forcing the member 242 down along the inclined face of the slot 226 which it normally rests against. This effectively reduces any play between the dove tail slot 226 and the mating dove tail section 204.

To move the member 242 more-or-less transverse to the slot 226, one or more set screws 252 are positioned in a like number of threaded passages 254 as shown best in FIGS. 17 and 18. Advancement of the screws 252 into the passages 254 moves the member 242 directly toward the opposite face of the dove tail slot.

After the inner and outer jaw parts 192, 194 have been moved to their desired position, a set screw (not shown) may be advanced through a threaded opening 234 into engagement with the threaded member 218.

Referring to FIGS. 20–22, there is illustrated another embodiment of this invention which, in many respects is identical with the embodiment of FIGS. 13–16. Thus, a chuck jaw assembly 260 of this invention comprises an axially inner jaw part 264 for receipt in the slot 38 for engagement with the scroll ring 46, an axially outer jaw part 262 and an adjustment mechanism 266 for moving the outer jaw part 262 relative to the inner jaw part 264.

With the exception of means 268 to secure the jaw parts 262, 264 in any of a plurality of positions, the assembly 260 is identical with the assembly 140. In the assembly 140, a set screw is received in the threaded passage 176 to bind against the lead screw 160 and thereby secure the inner and outer jaw parts 142, 144 together. Instead, the means 268 comprises a pair of passages 270, 272 extending from opposite ends of the inner jaw part 264. The passage 270 opens, for about 45°, between the inclined dove tail slot face 274 and horizontal face 276 while the passage 272 opens, for about 45°, between the inclined dove tail face 278 and horizontal face 280. The passages 270, 272 are threaded with a conventional helical thread which is interrupted in the 45° region where the passages 270, 272 are open. If desired, the passages 270, 272 may be placed on the same side of the inner jaw part 264 rather than on opposite sides.

The outer jaw part 262 provides a pair of smooth elongate radial passage segments 282, 284 in the corner of the dove tail slot 286. The passage segments 282, 284 match up with the threaded passages 270, 272 in the assembled position of the jaw parts 262, 264 and are of sufficient size to receive that portion of a threaded set screw 285 which extends out of the passages 270, 272.

To assemble the jaw parts 262, 264, the adjusting mechanism 266 is placed in the inner jaw part 264, the dove tail sections are radially advanced toward each other and the lead screw 288 is rotated to advance the outer jaw part 262 to a desired position along the inner jaw part 264. To secure the jaw part 262 in position, the set screws 282, 284 are inserted into the passages 270, 272 and threadably advanced, as by the use of an Allen wrench. So long as one or both of the set screws 282, 284 has not reached the ends 290, 292 of the passages 270, 272, the outer jaw part 262 can move relative to the inner jaw part 264. However, when both set screws 285, 284 bottom out at the ends 290, 292 of the threaded passages 270, 272, the outer jaw part 262 becomes rigid with the inner jaw part 264.

As shown in FIG. 23, a chuck jaw assembly 294 includes a Vernier scale 296 comprising a predetermined number, such as ten, of scratches or indicia 298 on one of the jaw parts 300 and one less indicia 302 on the other jaw part 302. The Vernier scale 296 is placed on the jaw parts 300, 302 so the central indicia align when the upper jaw part is concentric with the axis of the chuck. The concentric position of the upper jaw part 300 can accordingly be located with substantial precision.

Figure 14:
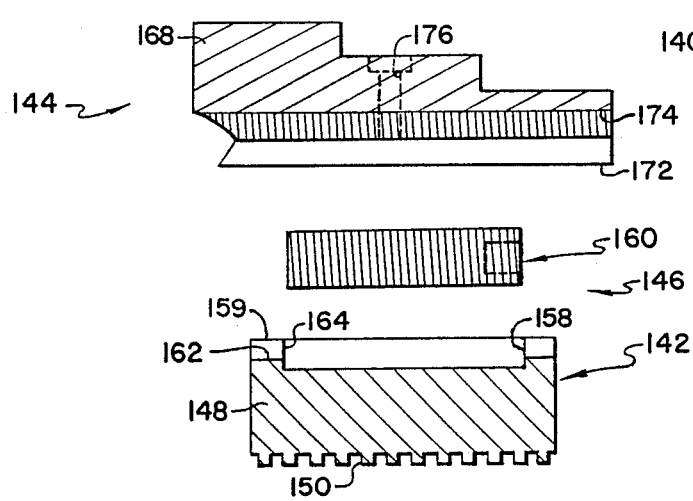
FIG. 14 is an end view of the embodiment of FIG. 13.

Another important part of this invention is shown in FIGS. 2, 10 and 14 where a series of equally spaced lines or indicia 306 are located on the end surface of the lower jaw parts 58, 142 and radiate from the axis of the passages 70, 174 and thus from the axis of the lead screws 106, 160. The lead screws 106, 160 can be machined to any predetermined number of threads per linear measurement —10–50 threads per inch are typical. Using 20 threads per inch as illustrative, one complete revolution of the lead screws 106, 160 is 1000/20 or 50 thousandths of an inch. The indicia 306 divide a segment of one revolution into a predetermined number of parts. The indicia 306 are desirably spaced so rotation of the lead screw 106, 160 between two adjacent indicia 306 causes the upper jaw part 60, 144 to move some easily remembered predetermined distance, such as 5/1000's of an inch. At 20 threads to the inch and desiring a 0.005 spacing between adjacent marks, the indicia 306 are spaced 36° apart. At 20 threads to the inch and desiring a 0.002 spacing between adjacent marks, the indicia 306 are spaced 14.4°. By using the point of the pentagonal or hexagonal wrench openings 114, 180 as a pointer, the lead screws 106, 160 and indicia 306 cooperate to provide an adjustment for the upper jaw parts 60, 144 which is of substantial accuracy.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

I claim:

1. A chuck comprising
   a chuck body having an axis;
   a plurality of chuck jaws movable radially on the body in a converging path for grasping a work piece therebetween including a first jaw part, a second jaw part, means mounting the second jaw part on the first jaw part for movement toward the axis relative to the first jaw part for engaging a work piece, and means including a threaded member interconnecting the first and second jaw parts for moving the second jaw part relative to the first jaw part;
   means carried by the body and engaging the first jaw part of each of the plurality of chuck jaws for simultaneously moving each of the chuck jaws toward and away from the axis; and
   means carried by the jaw parts to determine when each of the second jaw parts are at a predetermined location, the predetermined locations being concentric with the axis, including
     a spring biased detent carried by one of the jaw parts, the other jaw part providing a recess receiving the detent.

2. The chuck of claim 1 wherein the other jaw part provides a series of linearly arranged spaced apart recesses.

3. The chuck of claim 1 wherein the spring biased detent is carried by the second jaw part and the first jaw part provides the recess.

4. The chuck of claim 1 wherein the spring biased detent comprises a first spring biased detent on a first side of the one jaw part, and wherein the means carried by the jaw parts to determine when each of the second jaw parts are at a predetermined location further comprise a second spring biased detent on a second side of the one jaw part, and wherein
   the other jaw part provides a first series of linearly arranged spaced apart recesses on a first side of the other jaw part for engagement with the first detent and a second series of linearly arranged spaced apart recesses on a second side of the other jaw part for engagement with the second detent, the recesses of the second series being of set relative to the recesses of the first series.

5. The chuck of claim 1 wherein the first and second jaw parts include juxtaposed exposed exterior planar surfaces extending beyond the chuck body and further comprising indicia on the first jaw part exposed exterior planar surface and indicia on the second jaw part exposed exterior planar surface, the indicia being in alignment when the jaw parts are concentric with the axis.

6. The chuck of claim 1 wherein the first and second jaw parts include juxtaposed exposed exterior planar surfaces extending beyond the chuck body and further comprising a first series of indicia on the first jaw part exposed exterior planar surface and a second series of indicia on the second jaw part exposed exterior planar surface, the indicia comprising a Vernier scale.

7. The chuck of claim 1 wherein the threaded member has an axis and is exposed through an end of the chuck jaws and further comprising indicia on the end of the chuck jaws on lines radiating from the threaded member axis.

8. A chuck comprising
   a chuck body having an axis;
   a plurality of chuck jaws movable radially on the body in a converging path toward and away from the axis for respectively grasping and releasing a work piece therebetween including
   a first jaw part and a second jaw part mounted on the first jaw part for movement toward the axis relative to the first jaw part for engaging a work piece,
   the first jaw part comprising a rectangular body having
     a lower end providing a plurality of arcuate threaded sections and
     an upper end providing a first laterally extending wing extending beyond the lower jaw end and providing a recess,
   means interconnecting the first and second jaw parts for moving the second jaw part relative to the first jaw part, including a threaded member, one of the jaw parts having threads and threadably engaging the threaded member, the other of the jaw parts being free of threads and including means captivating the threaded member for nonthreadable rotation relative thereto; and
   means carried by the body and engaging the threaded sections of the lower end of the first jaw part of each of the plurality of chuck jaws for simultaneously moving each of the chuck jaws toward and away from the axis; and
   means carried by the jaw parts to determine when the second jaw parts are concentric with the axis, including
     a spring biased detent carried by the second jaw part and received in the recess provided by the wing.

9. The chuck of claim 8 wherein the one jaw part comprises a semicylindrical passage having the threads.

10. The chuck of claim 9 wherein the captivating means comprises a recess in the other jaw part having end walls for abutting the threaded member.

11. The chuck of claim 9 wherein the captivating means comprises first and second aligned recesses and a passage interconnecting the recesses, the threaded member includes first threaded section in the first recess, a second threaded section in the second recess and a spindle interconnecting the first and second threaded sections.

12. The chuck of claim 11 wherein each of the recesses includes a pair of end walls for abutting the first and second threaded sections.

13. The chuck of claim 8 further comprising means independent of the threaded member for clamping the first and second jaw parts in a predetermined position.

14. The chuck of claim 13 wherein one of the first and second jaw parts provides a slot and the other of the first and second jaw parts provides a slide in the slot allowing movement of the second jaw part therein, the one jaw part provides first and second threaded passages extending parallel to the slot and opening into the slot along a substantial portion of the length of the passages, the clamping means comprising the threaded passages and a pair of threaded members, in the passages, abutting the other of the jaw parts.

15. The chuck of claim 9 wherein the first and second jaw parts provide therebetween a dove tail slot having converging slot side walls and a male dove tail member, received in the slot, having diverging side walls respectively facing the slot side walls, the dove tail slot providing a threaded corner extending parallel to the slot, and further comprising a wear compensating member received between one of the slot side walls and one of the facing member side walls and means forcing the wear compensating member against the facing member side wall, forcing means to force the compensating member along said one slot side wall the forcing means comprising a threaded member in the threaded corner butting the wear compensating member.

16. The chuck of claim 8 wherein the upper end of the first jaw part provides a dove tail slide having upwardly diverging side faces, the recess opening into the top of the slide and a second wing opposite from the first wing extending beyond the lower jaw end, the wings providing a pair of parallel rows of recesses.

17. The chuck of claim 16 wherein the recesses of one of the rows is offset from the recesses of the other of the rows.

* * * * *